(12) United States Patent
Yamamoto et al.

(10) Patent No.: US 10,508,249 B2
(45) Date of Patent: Dec. 17, 2019

(54) GREASE COMPOSITION FOR ROLLING BEARINGS AND ROLLING BEARING

(71) Applicant: KYODO YUSHI CO., LTD., Fujisawa-shi, Kanagawa (JP)

(72) Inventors: Masamichi Yamamoto, Fujisawa (JP); Noriko Tanaka, Chigasaki (JP); Kenichiro Matsubara, Shanghai (CN)

(73) Assignee: KYODO YUSHI CO., LTD., Fujisawa-Shi, Kanagawa (JP)

( * ) Notice: Subject to any disclaimer, the term of this patent is extended or adjusted under 35 U.S.C. 154(b) by 0 days.

(21) Appl. No.: 15/519,867

(22) PCT Filed: Oct. 22, 2015

(86) PCT No.: PCT/JP2015/079810
§ 371 (c)(1),
(2) Date: Apr. 18, 2017

(87) PCT Pub. No.: WO2016/063938
PCT Pub. Date: Apr. 28, 2016

(65) Prior Publication Data
US 2018/0216025 A1    Aug. 2, 2018

(30) Foreign Application Priority Data
Oct. 22, 2014    (JP) .................................. 2014-215463

(51) Int. Cl.
*C10M 169/00*    (2006.01)
*C10M 115/08*    (2006.01)
(Continued)

(52) U.S. Cl.
CPC ........ *C10M 169/00* (2013.01); *C10M 101/02* (2013.01); *C10M 107/02* (2013.01); *C10M 111/04* (2013.01); *C10M 115/08* (2013.01); *C10M 133/12* (2013.01); *C10M 133/44* (2013.01); *C10M 135/20* (2013.01); *C10M 135/36* (2013.01); *C10M 141/08* (2013.01); *C10M 169/06* (2013.01); *F16C 33/6633* (2013.01); *C10M 2203/003* (2013.01); *C10M 2203/1025* (2013.01); *C10M 2205/0206* (2013.01); *C10M 2205/0285* (2013.01); *C10M 2207/2835* (2013.01); *C10M 2215/064* (2013.01); *C10M 2215/1026* (2013.01); *C10M 2215/223* (2013.01); *C10M 2215/224* (2013.01); *C10M 2215/26* (2013.01); *C10M 2215/28* (2013.01); *C10M 2215/30* (2013.01); *C10M 2219/09* (2013.01); *C10M 2219/106* (2013.01);
(Continued)

(58) Field of Classification Search
CPC .......... C10M 169/00; C10M 107/02; C10M 111/04; C10M 115/08; C10M 133/44; C10M 135/36; C10M 135/20; C10M 133/12; C10M 141/08; C10M 101/02; C10M 2203/003; C10M 2205/0206; C10M 2215/28; C10M 2215/30; C10M 2219/106; C10M 2215/26; C10M 2219/09; C10M 169/06; C10M 2215/224; C10M 2215/223; C10M 2215/1026; C10M 2215/064; C10M 2207/2835; C10M 2205/0285; C10M 2203/1025; F16C 33/6633; C10N 2240/02; C10N 2250/10; C10N 2230/10; C10N 2230/36; C10N 2230/76; C10N 2230/70; C10N 2220/022

See application file for complete search history.

(56) References Cited

U.S. PATENT DOCUMENTS 6,214,774 B1    4/2001    Nozaki et al.
6,245,725 B1 *  6/2001    Tanaka ................. C10M 141/08
                                                508/365
(Continued)

FOREIGN PATENT DOCUMENTS

CN    103140578 A    6/2013
CN    103814119 A    5/2014
(Continued)

OTHER PUBLICATIONS

Synthetic Oil Viscosity & Compatibility Chart NYE Lubricants.com Date Unknown (Year: 2019).*
(Continued)

*Primary Examiner* — Pamela H Weiss
(74) *Attorney, Agent, or Firm* — Buchanan, Ingersoll & Rooney PC

(57) ABSTRACT

The invention provides a grease composition for rolling bearings that can exhibit improved bearing life that can secure the low noise performance under high temperature conditions, and a rolling bearing where the above-mentioned grease composition is enclosed. The grease composition for rolling bearings includes a base oil, a urea thickener and a metal deactivator. The base oil has an aniline point of 110° C. or more. The urea thickener is at least one kind of diurea compound selected from the group consisting of diurea compounds represented by formula (1): $R^1$—NHCONH—$R^2$—NHCONH—$R^3$ (wherein $R^1$ and $R^3$, which may be the same or different from each other represent a $C_{6\text{-}30}$alkyl group, a $C_{5\text{-}8}$cycloalkyl group or a $C_{6\text{-}10}$aryl group, and $R^2$ represents a bivalent aromatic hydrocarbon group having 6 to 15 carbon atoms.)

9 Claims, No Drawings

(51) Int. Cl.

| | |
|---|---|
| *C10M 133/12* | (2006.01) |
| *C10M 133/44* | (2006.01) |
| *C10M 135/20* | (2006.01) |
| *C10M 135/36* | (2006.01) |
| *C10M 141/08* | (2006.01) |
| *C10M 101/02* | (2006.01) |
| *C10M 107/02* | (2006.01) |
| *C10M 111/04* | (2006.01) |
| *F16C 33/66* | (2006.01) |
| *C10M 169/06* | (2006.01) |

(52) U.S. Cl.
CPC .... *C10N 2220/022* (2013.01); *C10N 2230/10* (2013.01); *C10N 2230/36* (2013.01); *C10N 2230/70* (2013.01); *C10N 2230/76* (2013.01); *C10N 2240/02* (2013.01); *C10N 2250/10* (2013.01)

(56) References Cited

U.S. PATENT DOCUMENTS

| | | | | |
|---|---|---|---|---|
| 7,385,880 | B2 * | 6/2008 | Akao | C10M 169/00 |
| | | | | 368/62 |
| 9,567,545 | B2 * | 2/2017 | Mizuki | C10M 169/02 |
| 2004/0224860 | A1 * | 11/2004 | Baba | C10M 133/06 |
| | | | | 508/545 |
| 2008/0219610 | A1 | 9/2008 | Nakatani et al. | |
| 2009/0003742 | A1 | 1/2009 | Nakatani et al. | |
| 2014/0193110 | A1 | 7/2014 | Soga et al. | |
| 2014/0254968 | A1 | 9/2014 | Nakagawa et al. | |

FOREIGN PATENT DOCUMENTS

| | | | |
|---|---|---|---|
| JP | 10-204469 A | | 8/1998 |
| JP | 2003222144 A | * | 8/2003 |
| JP | 2004-149620 A | | 5/2004 |
| JP | 2004-211797 A | | 7/2004 |
| JP | 2008-143979 A | | 6/2008 |
| JP | 2008143979 A | * | 6/2008 |
| JP | 2010-222516 A | | 10/2010 |
| JP | 2012-236935 A | | 12/2012 |
| JP | WO 2013015413 A1 | * | 1/2013 ........ C10M 169/02 |
| JP | 2013-217428 A | | 10/2013 |
| JP | 2013217428 A | * | 10/2013 |
| WO | WO 2006/043566 A1 | | 4/2006 |
| WO | WO 2006/078035 A1 | | 7/2006 |
| WO | 2014/142198 A1 | | 9/2014 |

OTHER PUBLICATIONS

O.P. Vermani et al.: "4.5 Aniline Point", In: Applied Chemistry Theory and Practice, Second Edition, Jan. 1, 2005, New Age International (P) Limited, New Delhi, pp. 95-99, XP-055459177 (7 pages).

T.M. Vendura: "Evaluating Compatibility of Greases With Elastomeric Seals", NLGI Spokesman, vol. 42, No. 1, Apr. 1978, pp. 20-29, XP-009502397 (10 pages).

Extended Search Report issued by the European Patent Office in corresponding European Patent Application No. 15852936.2-1104 dated Mar. 23, 2018 (9 pages).

International Search Report (PCT/ISA/210) dated Nov. 17, 2015, by the Japanese Patent Office as the International Searching Authority for International Application No. PCT/JP2015/079810.

Written Opinion (PCT/ISA/237) dated Nov. 17, 2015, by the Japanese Patent Office as the International Searching Authority for International Application No. PCT/JP2015/079810.

Journal of Economic Maintenance Tribology, May 5, 1999, No. 398, pp. 6-11 (10 pages including partial English translation)..

Idemitsu Gihou, Aug. 15, 1999, vol. 42, No. 4, pp. 40-47 (13 pages including partial English translation).

Notification of Reasons for Refusal issued by the Japanese Patent Office in corresponding Japanese Patent Application No. 2014-215463 dated Aug. 23, 2018 (11 pages including partial English translation).

Ming et al.: "Mineral Oil Emulsions and Their Applications in Sustainable Pest Control and Green Agriculture," Guandong Science and Technology Press, Nov. 2006, 1st Edition, p. 18.

The First Office Action issued by the State Intellectual Property Office of People's Republic of China in corresponding Chinese Patent Application No. 201580057429.7 dated Jul. 30, 2019 (15 pages including partial English translation).

\* cited by examiner

US 10,508,249 B2

GREASE COMPOSITION FOR ROLLING BEARINGS AND ROLLING BEARING

TECHNICAL FIELD

The present invention relates to a grease composition for the rolling bearings, and a rolling bearing where the above-mentioned grease composition is enclosed.

BACKGROUND ART

The demand for the motors of automobiles, household electrical appliances, information appliances and industrial machinery is expanding, and the bearing used for the rotational part of the motors is required to have quietness in addition to durability. Reduction of the noise generating from the bearings of the motors (for example, brushless motors and fan motors) in the household electrical appliances and information appliances is a particularly urgent issue because those appliances are operated somewhere near the people.

The noise of the bearing is largely affected by the kind of grease composition enclosed in the bearing. The sliding surface of the bearing is lubricated with an oil film formed by the grease composition. Depending on the kind of grease composition, the formed oil film may be distorted and such distortion is considered to vibrate the bearing, which will cause the noise.

For the purpose of improving the noise performance of the bearings, a variety of grease compositions are proposed. For example, JP 2010-222516 A describes a grease composition designed for the rolling bearings of automotive motors, comprising a particular ester type synthetic oil as the base oil, and a lithium soap as the thickener.

However, the above-mentioned grease composition comprising the lithium soap as the thickener shows insufficient durability at high temperatures although the noise performance of the bearing can be relatively improved. Further, the above-mentioned grease composition tends to swell the sealing member (made of rubber or resin) for sealing the gap between the inner ring and the outer ring of the bearing, so that the sealing performance of the sealing member may be impaired.

JP 2004-211797 A describes a grease composition to be enclosed in the rolling bearing, comprising as the thickener a diurea compound containing a fibrous material with a fiber length of at least 3 μm. JP 2008-143979 A describes a grease composition comprising a particular synthetic hydrocarbon oil as the base oil, a diurea compound as the thickener, and a zincate or ammonium salt of organic sulfonic acid.

The grease compositions disclosed in JP 2004-211797 A and JP 2008-143979 A, which comprise the diurea compounds as the thickeners show high durability at high temperatures and improved noise performance of the bearing. However, in response to the recent strict demand for quietness, it is desired to secure the low noise performance of the bearing at high temperatures not only in the initial stage, but also for an extended period of time, that is, the life of bearing with low noise performance is desired to extend. To satisfy the above-mentioned severe requirements, those conventional grease compositions should be further improved.

In the bearings incorporated in the small-sized motors of the household electrical appliances and information appliances, there is still a high demand for improvement of the life that can secure the low noise performance under high temperature conditions.

SUMMARY OF INVENTION

Technical Problem

An object of the invention is to provide a grease composition for rolling bearings, capable of showing the improved bearing life that can secure the low noise performance under high temperature conditions; and a rolling bearing where the above-mentioned grease composition is enclosed.

Solution to Problem

As a result of extensive studies to solve the above-mentioned problems, the inventors of the present invention found that the duration when the rolling bearing can secure the low noise performance within a high temperature region can be improved by using a grease composition comprising a base oil, a particular diurea compound, and a metal deactivator in combination. The present invention has been thus accomplished.

Namely, the present invention provides a grease composition shown below:

[1] A grease composition for rolling bearings, comprising a base oil, a urea thickener and a metal deactivator, wherein; the base oil has an aniline point of 110° C. or more, and the urea thickener is at least one selected from the group consisting of diurea compounds represented by formula (1):

$$R^1\text{—NHCONH—}R^2\text{—NHCONH—}R^3 \quad (1)$$

wherein $R^1$ and $R^3$ which may be the same or different from each other represent a $C_{6-30}$alkyl group, a $C_{5-8}$cycloalkyl group or a $C_{6-10}$aryl group, and $R^2$ represents a bivalent aromatic hydrocarbon group having 6 to 15 carbon atoms.

[2] The grease composition for rolling bearings, described in the above-mentioned item [1], wherein the urea thickener is at least one selected from the group consisting of diurea compounds represented by formulas (2) to (4):

$$R^4\text{—NHCONH—}R^2\text{—NHCONH—}R^4 \quad (2)$$

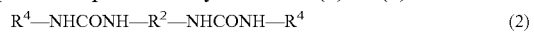

$$R^4\text{—NHCONH—}R^2\text{—NHCONH—}R^5 \quad (3)$$

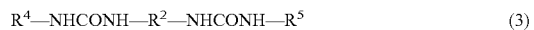

$$R^5\text{—NHCONH—}R^2\text{—NHCONH—}R^5 \quad (4)$$

wherein $R^2$ represents a bivalent aromatic hydrocarbon group having 6 to 15 carbon atoms; $R^4$ represents a $C_{10-26}$ alkyl group, and $R^5$ represents a $C_{5-7}$cycloalkyl group.

[3] The grease composition for rolling bearings, described in the above-mentioned item [2], wherein the ratio of the number of moles of $R^4$ to the total number of moles of $R^4$ and $R^5$, expressed by [100×(the number of moles of $R^4$)/(the number of moles of $R^4$+the number of moles of $R^5$)] is in the range of 50 to 90 mol % in the urea thickener.

[4] The grease composition for rolling bearings, described in any one of the above-mentioned items [1] to [3], wherein the metal deactivator is at least one selected from the group consisting of a benzotriazole compound, a thiadiazole compound, and a benzimidazole compound.

[5] The grease composition for rolling bearings, described in any one of the above-mentioned items [1] to [4], wherein the metal deactivator is contained in an amount of 0.1 to 10 mass % based on the total mass of the grease composition.

[6] The grease composition for rolling bearings, described in any one of the above-mentioned items [1] to [5], wherein the base oil is a mineral oil and/or a synthetic hydrocarbon oil.

[7] The grease composition for rolling bearings, described in any one of the above-mentioned items [1] to [6], wherein the base oil has a kinematic viscosity at 40° C. of 15 to 200 mm²/s.

[8] A rolling bearing wherein the grease composition for rolling bearings described in any one of the above-mentioned items [1] to [7] is enclosed.

Effects of Invention

The grease composition of the invention can improve the bearing life that can secure the low noise performance in a high temperature region. In addition, the grease composition of the invention does not have an adverse effect on the sealing performance of the sealing member without swelling the rubber or resin used for the sealing member. The grease composition of the invention can therefore support the effects of the sealing member (e.g., prevention of contamination by foreign matter and prevention of leakage of grease) for an extended period of time.

DESCRIPTION OF EMBODIMENTS

<Grease Composition>

The grease composition of the invention, which can be used for the rolling bearings comprises a base oil, a particular urea thickener and a metal deactivator.

(Base Oil)

The base oil that can be used in the invention is not particularly limited so long as the aniline point of the base oil is 110° C. or more. The aniline point, as defined in the JIS K 2256, is the lowest temperature at which equal volumes of aniline and the sample can form a homogeneous liquid phase (in other words, the minimum temperature at which aniline and the sample are completely miscible, and as soon as the above-mentioned temperature is lowered, aniline and the sample begin to separate from each other and the mixture becomes turbid. When the aniline point of the base oil is too low, the base oil may swell the rubber or resin used for the sealing member, to adversely affect the sealing performance of the sealing member. Therefore, the aniline point of the base oil may preferably be 120° C. or more, and more preferably 125° C. or more (for example, 130 to 200° C.).

The base oil is roughly divided into mineral oils and synthetic oils. Examples of the mineral oils include paraffinic mineral oils, naphthenic mineral oils and the like. Examples of the synthetic oils include ester oils (e.g., diesters and polyol esters), ether oils (e.g., polyalkylene glycols and polyphenyl ethers), synthetic hydrocarbon oils (e.g., poly α-olefins, polybutene and alkylbenzene), silicone oils, fluorinated oils, and the like. Those base oils may be used alone or two or more base oils may be used in combination.

Among the above base oils, the mineral oil and/or the synthetic hydrocarbon oil is preferable. Of the mineral oils, the paraffinic mineral oils are preferred. Of the synthetic hydrocarbon oils, the poly α-olefins are preferred. For the base oil comprising the mineral oil and/or the synthetic hydrocarbon oil, the ratio by mass of the mineral oil to the synthetic hydrocarbon oil is not particularly limited, but may be, for example, 50/50 to 100/0 (for example, 60/40 to 99/1), preferably 65/35 to 100/0, and more preferably 70/30 to 100/0 (for example, 75/25 to 100/0).

The kinematic viscosity of the base oil at 40° C. is not particularly limited, but may be in the range of 15 to 200 mm²/s, preferably 30 to 100 mm²/s (for example, 48 to 70 mm²/s). The kinematic viscosity mentioned above is determined by any methods in accordance with the JIS K 2283.

The content of the base oil may preferably be in the range of 70 to 95 mass %, and more preferably 75 to 90 mass %, with respect to the total mass of the grease composition of the invention.

(Urea Thickener)

The urea thickener that can be used in the invention is at least one selected from the group consisting of diurea compounds represented by the following formula (1):

$$R^1-NHCONH-R^2-NHCONH-R^3 \quad (1)$$

wherein $R^1$ and $R^3$ which may be the same or different from each other represent a $C_{6-30}$alkyl group, a $C_{5-8}$cycloalkyl group or a $C_{6-10}$aryl group, and $R^2$ represents a bivalent aromatic hydrocarbon group having 6 to 15 carbon atoms.

The $C_{6-30}$alkyl groups represented by $R^1$ and $R^3$ may be straight-chain or branched alkyl groups, for example, octyl group, decyl group, undecyl group, lauryl group, tridecyl group, myristyl group, pentadecyl group, cetyl group, heptadecyl group, stearyl group, nonadecyl group, and the like.

The $C_{5-8}$cycloalkyl groups represented by $R^1$ and $R^3$ include cyclopentyl group, cyclohexyl group, cycloheptyl group, and cyclooctyl group. The $C_{5-8}$cycloalkyl group may have a substituent (for example, a $C_{1-4}$alkyl group such as methyl group or the like.).

The $C_{6-10}$aryl groups represented by $R^1$ and $R^3$ include phenyl group, naphthyl group and the like. The $C_{6-10}$aryl group may have a substituent (for example, a $C_{1-4}$alkyl group such as methyl group or the like.).

$R^2$ represents a bivalent aromatic hydrocarbon group having 6 to 15 carbon atoms. The term "aromatic hydrocarbon group" herein used should be understood as not only arene ring groups (groups consisting of arene rings), but also arene-ring containing groups (groups composed of an arene ring and an aliphatic hydrocarbon chain).

Examples of the bivalent aromatic hydrocarbon group include arylene groups (such as phenylene group, naphthylene group and the like), diarylalkanediyl groups (such as diphenylmethanediyl group and the like), and biaryldiyl groups (such as biphenyldiyl group and the like). In those groups, the arene ring may have a substituent (for example, a $C_{1-4}$alkyl group such as methyl group or the like.).

From the viewpoint of the life that can secure the low noise performance, $R^1$ and $R^3$ may preferably each represent a $C_{10-26}$alkyl group (for example, a $C_{16-20}$alkyl group such as stearyl group or the like) or a $C_{5-7}$cycloalkyl group (for example, cyclohexyl group). Preferably, $R^2$ may be a group represented by the following formulas (A) to (C), and the group represented by the formula (B) is particularly preferable.

(Chemical 1)

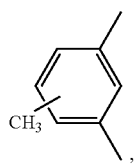

(A)

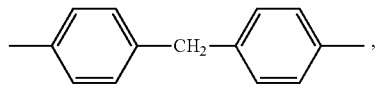

(B)

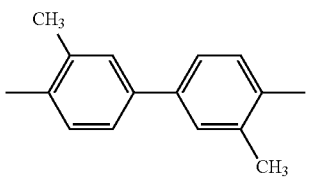

(C)

The urea thickener used in the invention may preferably be at least one selected from the group consisting of diurea compounds represented by the following formulas (2) to (4):

$$R^4-NHCONH-R^2-NHCONH-R^4 \quad (2)$$

$$R^4-NHCONH-R^2-NHCONH-R^5 \quad (3)$$

$$R^5-NHCONH-R^2-NHCONH-R^5 \quad (4)$$

wherein $R^4$ represents a $C_{10\text{-}26}$alkyl group, $R^5$ represents a $C_{5\text{-}7}$cycloalkyl group, and $R^2$ is the same as that previously defined.

Of the $C_{10\text{-}26}$alkyl groups represented by $R^4$, a $C_{16\text{-}20}$alkyl group such as stearyl group or the like is preferable. Of the $C_{5\text{-}7}$cycloalkyl groups represented by $R^5$, cyclohexyl group is preferable.

Preferably, the urea thickener used in the invention may comprise at least the compound of formula (3), i.e., the alicyclic aliphatic diurea compound. More preferably, the urea thickener may all comprise the compound of formula (2), i.e., the aliphatic diurea compound, the compound of formula (3), and the compound of formula (4), i.e., the alicyclic diurea compound.

In the urea thickener, i.e., at least one kind of diurea compound selected from the compounds represented by formulas (2) to (4), the ratio of the number of moles of $R^4$ to the total number of moles of $R^4$ and $R^5$, expressed by [100×(the number of moles of $R^4$)/(the number of moles of $R^4$+the number of moles of $R^5$)] is not particularly limited, and may be less than 50 mol %, for example. However, in light of the life that can secure the low noise performance under high temperatures, the above-mentioned ratio may be 50 mol % or more (e.g., 50 mol % or more and less than 90 mol %). The ratio of the number of moles of $R^4$ to the total number of moles of $R^4$ and $R^5$ can be controlled by adjusting the proportion of the aliphatic monoamine and the alicyclic monoamine used as the raw materials.

When the ratio of the number of moles of $R^4$ to the total number of moles of $R^4$ and $R^5$ is too small, the resultant grease shows poor fluidity, which may have an adverse effect on the lubrication life under high temperatures. When the ratio of the number of moles of $R^4$ to the total number of moles of $R^4$ and $R^5$ is too large, leakage of grease will often occur (in particular under the conditions of high-speed rotation), which may also may have an adverse effect on the lubrication life under high temperatures. The ratio of the number of moles of $R^4$ to the total number of moles of $R^4$ and $R^5$ may preferably be 55 to 85 mol %, more preferably 60 to 80 mol %, and most preferably 65 to 75 mol % (e.g., 65 to 70 mol %) when consideration is given to the improvement of the life that can secure the low noise performance, with no adverse effect on the lubrication life at high temperatures.

The diurea compound represented by formula (1) can be obtained by a reaction of an aromatic diisocyanate component with a monoamine component.

Examples of the aromatic diisocyanate component, which corresponds to $R^2$, include xylene diisocyanate (XDI), tolylene diisocyanate (TDI), naphthalene diisocyanate (NDI), diphenylmethane diisocyanate (MDI), and toluene diisocyanate (TODI). Those aromatic diisocyanate components may be used alone or in combination. In particular, diphenylmethane diisocyanate (MDI) is preferable as the aromatic diisocyanate component.

The monoamine component, which corresponds to $R^1$, $R^3$, $R^4$ and $R^5$ includes, for example, aliphatic monoamines (e.g., $C_{6\text{-}30}$alkylamines such as stearylamine and the like), alicyclic monoamines (e.g., $C_{5\text{-}8}$cycloalkylamines such as cyclohexylamine and the like), and aromatic monoamines (e.g., $C_{6\text{-}10}$arylamines such as phenylamine and the like). Those monoamine components may be used alone or in combination.

The aliphatic monoamine and/or the alicyclic monoamine is preferred, and the combination of the aliphatic monoamine and the alicyclic monoamine is particularly preferred. Further, the $C_{16\text{-}20}$alkylamine such as stearylamine or the like is preferable as the aliphatic monoamine; and the $C_{5\text{-}7}$cycloalkylamine such as cyclohexylamine or the like is preferable as the alicyclic monoamine. Although the amount of aliphatic monoamine may be less than 50 mol %, use of the aliphatic monoamine in an amount of 50 mol % or more (for example, 50 mol % or more and less than 90 mol %) is preferable, 55 to 85 mol % (for example, 60 to 80 mol %) is more preferable, and 65 to 75 mol % (for example 65 to 70 mol %) is most preferable, with respect to the total amounts of aliphatic monoamine and alicyclic monoamine.

The reaction of the aromatic diisocyanate component with the monoamine component can be conducted in accordance with any of the conventional methods. The reaction temperature is 10 to 150° C., for example. The reaction may be carried out in the presence of a solvent. To use the base oil as the solvent is preferable because the resultant mixture can be incorporated into the grease composition as it is.

The content of the urea thickener may be in the range of 8 to 20 mass %, preferably 10 to 16 mass %, with respect to the total mass of the grease composition. Too much urea thickener will increase heat generation of the bearing, which may have an adverse effect on the lubrication life. When the content of the urea thickener is too low, leakage of the resultant grease will often occur, which may also have an adverse effect on the lubrication life.

(Metal Deactivator)

The metal activator used in the invention can prevent the urea thickener from adhering to the metal surface and accumulating thereon, so that the urea thickener can be maintained in a dispersed state, thereby significantly improving the bearing life that can secure the low noise performance. This is considered to result from the action of the metal deactivator to adhere to the metal surface and form a film thereon. Such an effect of the metal deactivator that can improve the bearing life of low noise performance has not been known, and just found by the invention.

The metal deactivator is not particularly limited. Examples of the metal deactivator include benzotriazole compounds such as benzotriazole and 1-[N,N-bis(2-ethylhexyl)aminomethyl]-4-methylbenzotriazole; thiadiazole compounds such as thiadiazole, 2-mercaptothiadiazole, and 2,5-bis(alkyldithio)-1,3,4-thiadiazole); and benzimidazole compounds such as benzimidazole, 2-mercaptobenzimidazole, 2-(decyldithio)-benzimidazole and the like. Those metal deactivators may be used alone or in combination. Of those metal deactivators, the benzotriazole compounds, in particular, 1-[N,N-bis(2-ethylhexyl)aminomethyl]-4-methylbenzotriazole) is preferable.

The content of the metal deactivator is not particularly limited, but may be 0.1 to 10 mass %, preferably 0.3 to 5 mass % (e.g., 0.5 to 1 mass %), based on the total mass of the grease composition.

The grease composition of the invention may further comprise any additives so long as the effects of the invention are not impaired. The additives may include an antioxidant, rust preventive, detergent dispersant, extreme pressure agent, anti-foam, antiemulsifier, oiliness improver, antiwear agent, solid lubricant, and the like. Those additives may be used alone or in combination. In most cases, at least one kind of additive selected from the group consisting of the antioxidant, the rust inhibitor and the detergent dispersant is used.

The antioxidant is not particularly limited, and amine compounds (e.g., aromatic amine compounds such as diphenylamine, phenyl-α-naphthylamine, phenothiazine, and the alkylated products thereof); and phenol compounds (e.g., hindered phenols such as 2,6-di-tert-butyl-p-cresol, pentaerythritol-tetrakis[3-(3,5-di-t-butyl-4-hydroxyphenyl)propionate], octadecyl-3-(3,5-di-t-butyl-4-hydroxyphenyl) propionate and the like.) Those antioxidants may be used alone or in combination. Of the above-mentioned antioxidants, the amine compounds, in particular diphenylamine is preferable.

The rust preventive, which is not particularly limited includes carboxylic acid type rust preventives such as lower fatty acids (e.g., alkenylsuccinic acid and the like), higher fatty acids (e.g., naphthenic acid, lanolin fatty acid and the like), salts of the above acids (e.g., alkali metal salts such as Na salts and the like, alkaline earth metal salts such as Ba salts, Ca salts, Mg salts and the like, metal salts such as Al salts, Zn salts and the like, and amine salts), anhydrides and esters (including half esters and the like when the acid is a dibasic acid) of the above-mentioned acids; and sulfonic acid type rust preventives such as sulfonates (e.g., alkali metal salts such as Na salts and the like, alkaline earth metal salts such as Ba salts, Ca salts and the like, and metal salts such as Zn salts and the like). Those rust preventives may be used alone or in combination.

The detergent dispersant is not particularly limited, and the metal type detergent dispersants including alkaline earth metal sulfonates (such as Ca sulfonates and the like), alkaline earth metal phenates (such as Ca phenates and the like), alkaline earth metal salicylates (such as Ca salicylates and the like), and alkaline earth metal phosphonates (such as Ca phosphonates and the like) can be employed. Those detergent dispersants may be used alone or in combination.

When the additives are added in the invention, the content of the additive(s) may be in the range of 0.01 to 10 mass % based on the total mass of the grease composition.

The worked penetration of the grease composition of the invention may be in the range of 130 to 385, preferably 200 to 300. As defined in JIS K 2220, the worked penetration is a value determined immediately after a plunger is stroked 60 times to work the sample in a predetermined container.

According to the invention, the life of the rolling bearing with low noise performance in the high temperature region can be significantly improved by the combination of a base oil, a particular urea thickener, and a metal deactivator. The reason for improvement of the bearing life with low noise performance at high temperatures has not been clarified, but the inventors of the invention suppose the reasons for the improvement to be as follows.

The urea thickener has high-temperature durability, but it is supposed that this kind of thickener tends to be adsorbed by the metal surface and accumulated thereon, and therefore the bearing life with low noise performance in the high temperature region cannot be sufficiently improved when the thickener is used alone. In contrast to this, when the urea thickener and the metal deactivator are used in combination, the metal deactivator is more likely to be adsorbed by the metal surface than the urea thickener, so that a film of the metal deactivator may be formed on the metal surface. This can prevent the urea thickener from being adsorbed by the metal surface and accumulated thereon. The urea thickener is therefore considered to be maintained in a dispersed state for an extended period of time, which can sufficiently improve the bearing life with low noise performance under high temperatures.

[Rolling Bearing]

The rolling bearing of the invention encloses therein the grease composition mentioned above. The rolling bearing comprises an inner ring, an outer ring, a cage that is interposed between the inner ring and the outer ring and retains a plurality of rotatable rolling elements (balls, rollers and the like), and a plurality of rolling elements (balls, rollers and the like) retained in the cage, with the bearing space between the inner ring and the outer ring being charged with a grease composition.

According to the invention, the bearing space between the inner ring and the outer ring may be hermetically sealed with the sealing member because the grease composition of the invention is designed so as not to impair the sealing performance of the sealing member. For the sealing member, a variety of rubbers, such as nitrile rubber (NBR), acrylic rubber, silicone rubber, fluororubber and the like may be used. Of the above rubbers, nitrile rubber is preferable.

Depending on the type of rolling elements, the rolling bearing of the invention may be ball bearings (for example, deep-groove ball bearings, angular rolling bearings, thrust ball bearings, and the like), and roller bearings (for example, cylindrical roller bearings, tapered roller bearings, and the like.).

The rolling bearing according to the invention exhibits the improved life when the low noise performance can be secured in the high temperature region. For example, even when the inner ring is continuously rotated for an extended period of time (e.g., 1,000 hours or more) in a high temperature region (e.g., at 100°) C or more), the degree of vibration transmitted to the outer ring (in terms of the Anderon value) can be reduced to a low value (e.g., less than 5). Further, the rolling bearing of the invention can keep the quietness even when turned at high speed. For example, even when the inner ring is rotated at high speed (e.g., 5000 rpm or more), the degree of vibration transmitted to the outer ring (in terms of the Anderon value) can be reduced to a low value (e.g., less than 5). The Anderon value can be determined using the conventional Anderon meter or the like.

The rolling bearing of the invention can advantageously be put to the uses requiring the long life that can secure the low noise performance under high temperatures, for example, the uses for the household electrical appliances (air conditioners, air cleaners, vacuum cleaners and the like) and information appliances (personal computers, television sets, hard discs and the like), particularly for the small-sized motors (such as brushless motors, fan motors and the like) of those appliances.

EXAMPLES

The invention will now be explained more specifically by referring to the following examples, but is not limited by those examples.

1. Preparation of Sample Grease Compositions 4,4'-diphenylmethane diisocyanate (MDI) was reacted with the predetermined amount(s) of amine(s) (cyclohexylamine (CHA) and/or stearylamine (SA)) in a base oil, to prepare a base grease. To the base grease, a metal deactivator was added, thereby obtaining a grease composition according to each of Examples and Comparative Examples. In Comparative Example 1, the base grease was used as it was without the addition of any metal deactivator.

The kinds of base oils and metal deactivators used in Examples and Comparative Examples are as follows:

(Base Oils)
Mineral oil: paraffinic mineral oil
Synthetic hydrocarbon oil: poly α-olefin
Ester oil: a mixed oil prepared by mixing dipentaerythritol oil and pentaerythritol oil at a ratio by mass of 53/47.

(Metal Deactivators)
A: benzotriazole compound, i.e., 1-[N,N-bis(2-ethylhexyl)aminomethyl]-4-methyl-benzotriazole)
B: thiadiazole compound, i.e., 2,5-bis(alkyldithio)-1,3,4-thiadiazole
C: benzimidazole compound, i.e., 2-mercaptobenzimidazole (Antioxidant)
Diphenylamine

2. Test Methods

The grease compositions obtained in Examples and Comparative Examples were evaluated in terms of the noise durability and the resistance of rubber according to the methods shown below.

[Noise Durability]

A noise durability test was conducted after enclosing 160 mg of each sample grease composition into a small-diameter deep-groove ball bearing having an inner diameter of 8 mm, an outer diameter of 22 mm, and a width of 7 mm. The test conditions included the atmosphere temperature of 140° C., the inner ring rotation speed of 5600 rpm, the axial load of 19.6 N, and the test duration of 1500 hours. The following criteria were used for judging the noise durability.

o: The Anderon value of 5 or less.

x: The Anderon value of more than 5.

[Resistance of Rubber]

The sealing member of NBR was immersed in each sample grease composition, and allowed to stand at 100° C. for 70 hours. Then, the sealing member was taken out of the grease composition, to measure the volume swell. The following criteria were used for judging the resistance of rubber.

oo: The volume swell of less than 10%.

o: The volume swell of 10% or more and less than 15%.

x: The volume swell of 15% or more.

3. Test Results

The results of the grease compositions obtained in Examples and Comparative Examples are shown in Table 1.

TABLE 1

| | | Examples | | | | | | | Comparative Examples | |
|---|---|---|---|---|---|---|---|---|---|---|
| | | 1 | 2 | 3 | 4 | 5 | 6 | 7 | 1 | 2 |
| Base Oil (Ratios of components by mass based on 100 mass % of base oil) | Mineral oil | 75 | 100 | 75 | 75 | 75 | 75 | 75 | 75 | 70 |
| | Synthetic hydrocarbon oil | 25 | — | 25 | 25 | 25 | 25 | 25 | 25 | — |
| | Ester oil | — | — | — | — | — | — | — | — | 30 |
| Thickener (Molar ratios of isocyanate and amine(s)) | MDI | 1 | 1 | 1 | 1 | 1 | 1 | 1 | 1 | 1 |
| | CHA | 0.6 | 0.6 | 0.6 | 0.6 | — | 0.6 | 0.6 | 0.6 | 0.6 |
| | SA | 1.4 | 1.4 | 1.4 | 1.4 | 2 | 1.4 | 1.4 | 1.4 | 1.4 |
| Metal Deactivator (mass % based on the total mass of grease composition) | A | 0.5 | 0.5 | 0.1 | 5 | 0.5 | — | — | — | 0.5 |
| | B | — | — | — | — | — | 0.5 | — | — | — |
| | C | — | — | — | — | — | — | 0.5 | — | — |
| Antioxidant (mass % based on the total mass of grease composition) | Diphenylamine | 2.5 | 2.5 | 2.5 | 2.5 | 2.5 | 2.5 | 2.5 | 2.5 | 2.5 |
| Aniline point of base oil (° C.) | | 130 | 110 | 130 | 130 | 130 | 130 | 130 | 130 | 100 |
| Kinematic viscosity of base oil at 40° C. (mm²/s) | | 48 | 48 | 48 | 48 | 48 | 48 | 48 | 48 | 48 |
| Worked penetration | | 235 | 235 | 235 | 235 | 235 | 235 | 235 | 235 | 235 |
| Noise durability | | o | o | o | o | o | o | o | x | o |
| Resistance of rubber | | oo | oo | oo | oo | oo | oo | oo | oo | x |

In the above, the content of the thickener was adjusted to 15 mass % based on the total mass of the grease composition, with the balance being compensated with the base oil.

As is apparent from Table 1, the grease compositions of Examples are superior to those of Comparative Examples in terms of the noise durability and the resistance of rubber.

The invention claimed is:

1. A grease composition for rolling bearings, comprising, with respect to the total mass of the composition, 75 to 90 mass % of a base oil, 8 to 20 mass % of a urea thickener and 0.1 to 5 mass% of a metal deactivator, wherein;
    the base oil is a mixture of a paraffinic mineral oil and poly-alpha-olefin at a mass ratio of 50/50 to 99/1, the base oil having an aniline point of 130° C. or more and having a kinematic viscosity at 40° C. of 15 to 200 mm²/s,
    the urea thickener is at least one selected from the group consisting of diurea compounds represented by formulas (2) to (4)

$$R^4-NHCONH-R^2-NHCONH-R^4 \quad (2)$$

$$R^4-NHCONH-R^2-NHCONH-R^5 \quad (3)$$

$$R^5-NHCONH-R^2-NHCONH-R^5 \quad (4)$$

wherein $R^2$ represents a bivalent aromatic hydrocarbon group having 6 to 15 carbon atoms; $R^4$ represents a $C_{10-26}$ alkyl group, and $R^5$ represents a $C_{5-7}$ cycloalkyl group and the ratio of the number of moles of $R^4$ to the total number of moles of $R^4$ and $R^5$, expressed by [100 x (the number of moles of $R^4$) / (the number of moles of $R^4$+the number of moles of $R^5$)] is in the range of 50 to 90 mol % in the urea thickener, and the metal deactivator is at least one selected from the group consisting of 1-[N,N-bis(2-ethylhexyl)aminomethyl]-4-methyl-benzotriazole, thiadiazole, 2-mercaptothiadiazole, 2,5-bis(alkyldithio)-1,3,4-thiadiazole, 2-mercaptobenzimidazole and 2-(decyldithio)-benzimidazole.

2. A rolling bearing wherein the grease composition for rolling bearings of claim 1 is enclosed.

3. The grease composition for rolling bearings of claim 1, wherein the base oil is a mixture of a mineral oil and a synthetic hydrocarbon oil, and the ratio by mass of the mineral oil to the synthetic hydrocarbon oil is 60/40 to 99/1.

4. The grease composition for rolling bearings of claim 1, wherein the metal deactivator is at least one selected from the group consisting of 1-[N,N-bis(2-ethylhexyl)aminomethyl]-4-methyl-benzotriazole, 2,5-bis(alkyldithio)-1,3,4-thiadiazole, and 2-mercaptobenzimidazole.

5. The grease composition for rolling bearings of claim 1, further comprising an amine compound as an antioxidant.

6. The grease composition for rolling bearings of claim 1, wherein the metal deactivator is 1-[N,N-bis(2-ethylhexyl) aminomethyl]-4-methyl-benzotriazole.

7. The grease composition for rolling bearings of claim 1, wherein the metal deactivator is 2,5-bis(alkyldithio)-1,3,4-thiadiazole.

8. The grease composition for rolling bearings of claim 1, wherein the metal deactivator is 2-mercaptobenzimidazole.

9. The grease composition for rolling bearings of claim 5, wherein the amine compound is diphenyl amine.

\* \* \* \* \*